United States Patent
Solihin (10) Patent No.: US 9,098,406 B2
(45) Date of Patent: Aug. 4, 2015

(54) MANAGING ADDRESSABLE MEMORY IN HETEROGENEOUS MULTICORE PROCESSORS

(75) Inventor: Yan Solihin, Apex, NC (US)

(73) Assignee: Empire Technology Development LLC, Wilmington, DE (US)

( * ) Notice: Subject to any disclaimer, the term of this patent is extended or adjusted under 35 U.S.C. 154(b) by 326 days.

(21) Appl. No.: 13/521,908

(22) PCT Filed: Jan. 23, 2012

(86) PCT No.: PCT/US2012/022185
§ 371 (c)(1),
(2), (4) Date: Jul. 12, 2012

(87) PCT Pub. No.: WO2013/112124
PCT Pub. Date: Aug. 1, 2013

(65) Prior Publication Data
US 2013/0191605 A1    Jul. 25, 2013

(51) Int. Cl.
G06F 12/02    (2006.01)
G06F 12/08    (2006.01)

(52) U.S. Cl.
CPC .......... *G06F 12/0284* (2013.01); *G06F 12/08* (2013.01); *G06F 2212/251* (2013.01); *G06F 2212/253* (2013.01)

(58) Field of Classification Search
CPC ... G06F 12/08; G06F 11/3006; G06F 9/4856; G06F 9/5016; G06F 12/10; G06F 12/109; G06F 12/1009; G06F 12/0804; G06F 2212/657; G06F 2212/7201; G06F 12/0607; G06F 12/02
See application file for complete search history.

(56) References Cited

U.S. PATENT DOCUMENTS

| | | |
|---|---|---|
| 6,195,731 B1 * | 2/2001 | Bordaz et al. ................ 711/147 |
| 6,425,072 B1 | 7/2002 | Meier et al. |
| 2007/0130445 A1 | 6/2007 | Lau et al. |
| 2007/0156973 A1 * | 7/2007 | Fleischer et al. ............ 711/147 |
| 2007/0294496 A1 | 12/2007 | Goss et al. |
| 2009/0235020 A1 * | 9/2009 | Srinivasan et al. ........... 711/106 |
| 2011/0153946 A1 | 6/2011 | Solihin |

OTHER PUBLICATIONS

International Search Report & Written Opinion dated May 8, 2012 in PCT Application No. PCT/US12/22185.

(Continued)

*Primary Examiner* — Cheng-Yuan Tseng
*Assistant Examiner* — Candice Rankin
(74) *Attorney, Agent, or Firm* — Turk IP Law, LLC (57) ABSTRACT

Technologies described herein generally describe technologies for managing addressable memories in a heterogeneous multicore chip. Technologies may be adapted to determine whether swapping a first data segment and a second data segment is suitable. The first data segment may be stored in a first addressable memory, and the second data segment may be stored in a second addressable memory. If the swapping is determined to be suitable, then the technologies may be adapted to swap the first data segment and the second data segment. As a result of the swap, the first data segment will be stored in the second addressable memory, and the second data segment will be stored in the first addressable memory. The technologies may also be adapted to update corresponding swap status indicators to indicate that the first data segment and the second data segment have moved.

16 Claims, 7 Drawing Sheets

(56) References Cited

OTHER PUBLICATIONS

Chaudhuri, Mainak, "PageNUCA: Selected Policies for Page-grain Locality Management in Large Shared Chip-multiprocessor Caches," IEEE 15th International Symposium on High Performance Computer Architecture, HPCA 2009. Feb. 2009.

Jiang, X. et al., "CHOP: Adaptive Filter-Based DRAM Caching for CMP Server Platforms," Proc. of the 16th International Symposium on High Performance Computer Architecture, HPCA 2010.

Tikir, M.M. et al., "Hardware Monitors for Dynamic Page Migration," Journal of Parallel and Distributed Computing vol. 68, Issue 9, Sep. 2008, pp. 1186-1200.

* cited by examiner

| | FIRST COLUMN 304A | SECOND COLUMN 304B | THIRD COLUMN 304C | FOURTH COLUMN 304D |
|---|---|---|---|---|
| FIRST ROW 302A | P1  306A | 2344 (LOCAL)  306C | 34678 (REMOTE)  306E | 0 |
| | P2 | 457 | 123 | 0 |
| | ... | ... | ... | ... |
| SECOND ROW 302B | P1001  306B | 45677 (REMOTE)  306D | 55630 (LOCAL)  306F | 0 |
| | P1002 | 2457 | 9 | 5 |
| | ... | ... | ... | ... |
| THIRD ROW 302C | P4001 | 0 | 0 | 34235 |
| FOURTH ROW 302D | P4002 | 0 | 0 | 12346 |

MANAGING ADDRESSABLE MEMORY IN HETEROGENEOUS MULTICORE PROCESSORS

CROSS-REFERENCE TO RELATED APPLICATION

The present application is a U.S. national stage filing under 35 U.S.C. §371 of PCT Application No. PCT/US12/22185 filed on Jan. 23, 2012.

BACKGROUND

Unless otherwise indicated herein, the materials described in this section are not prior art to the claims in this application and are not admitted to be prior art by inclusion in this section.

A heterogeneous multicore chip may include multiple heterogeneous processor cores and shared on-chip memory resources. The heterogeneous processor cores may include processor cores of varying sizes, performance, or complexity. The shared on-chip memory resources may include mixed memory hierarchies, having one or more cache memories, one or more addressable memories, or combinations thereof. Because heterogeneous multicore chips are an emerging technology, the management of data in the mixed memory hierarchies to achieve optimal performance has not been thoroughly explored.

SUMMARY

The present disclosure generally describes techniques for managing addressable memories in heterogeneous multicore chips. Some example methods may include swapping a first data segment with a second data segment without changing their physical addresses, and determining whether swapping a first data segment with a second data segment is suitable. The first data segment may be stored in a first addressable memory at a first address, and the second data segment may be stored in a second addressable memory at a second address. If the swapping is determined to be suitable, then example methods may swap the first data segment and the second data segment. As a result of the swap, the first data segment will be stored in the second addressable memory but will be addressable using the first address, and the second data segment will be stored in the first addressable memory but will be addressable using the second address.

The present disclosure generally also describes heterogeneous multicore chips. Some example heterogeneous multicore chips may include a first cluster of processor cores and a first memory hierarchy coupled to the first cluster of processor cores. The first memory hierarchy may include a first addressable memory. The first addressable memory may be adapted to store a first data segment at a first address. Example heterogeneous multicore chips also include a second cluster of processor cores and a second memory hierarchy coupled to the second cluster of processor cores. The second memory hierarchy may include a second addressable memory at a second address. The second addressable memory may be adapted to store a second data segment. Example heterogeneous multicore chips may further include a memory management unit. The memory management unit may be adapted to determine whether swapping the first data segment with the second data segment is suitable. If the swapping is determined to be suitable, then the memory management unit may be adapted to swap the first data segment and the second data segment. As a result of the swap, the first data segment will be stored in the second addressable memory but will be addressable using the first address, and the second data segment will be stored in the first addressable memory but will be addressable using the second address.

The present disclosure generally further describes some computer-readable media. Some example computer-readable media may include instructions stored thereon which, when executed by a computer, cause the computer to perform one or more operations. The computer may be configured to identify a swapping group. The swapping group may include a first page stored in a first addressable memory at a first address and a second page stored in a second addressable memory at a second address. The first addressable memory and the second addressable memory may be positioned on a heterogeneous multicore chip. The first addressable memory may be in closer physical proximity to a first cluster of processor cores than to a second cluster of processor cores on the heterogeneous multicore chip. Example operations may also cause the computer to determine whether swapping the first page with the second page is suitable based on a local access count and a remote access count. The local access count may be adapted to indicate accesses of the first page by the first cluster of processor cores and the second page by the second cluster of processor cores. The remote access count may be adapted to indicate accesses of the second page by the first cluster of processor cores and the first page by the second cluster of processor cores. If the swapping is determined to be suitable, then example operations may further swap the first data segment and the second data segment. As a result of the swap, the first data segment will be stored in the second addressable memory but will be addressable using the first address, and the second data segment will be stored in the first addressable memory but will be addressable using the second address.

The foregoing Summary is illustrative only and is not intended to be in any way limiting. In addition to the illustrative aspects, embodiments, and features described above, further aspects, embodiments, and features will become apparent by reference to the Figures and the following Detailed Description.

BRIEF DESCRIPTION OF THE FIGURES

The foregoing and other features of this disclosure will become more fully apparent from the following Detailed Description, accompanying Figures, and appended claims. Understanding that these Figures depict only several embodiments in accordance with the disclosure and are, therefore, not to be considered limiting of its scope, the disclosure will be described with additional specificity and detail with reference to the accompanying Figures, in which:

DETAILED DESCRIPTION

In the present Detailed Description, reference is made to the accompanying Figures, which form a part hereof. In the Figures, similar symbols typically identify similar components, unless context dictates otherwise. The illustrative embodiments described in the Detailed Description and Figures are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to a heterogeneous multicore chip having a memory management unit configured to manage addressable memories within the heterogeneous multicore chip. In particular, the memory management unit may be configured to maximize distance locality of data distributed across multiple addressable memories within the heterogeneous multicore chip. Distance locality can be maximized by increasing the number of accesses to local addressable memories and reducing the number of accesses to remote addressable memories.

The heterogeneous multicore chip may include multiple clusters. Each cluster may include one or more processor cores and a corresponding memory hierarchy containing one or more cache memories or one or more addressable memories. For example, a first cluster may include a first processor core and a first addressable memory, and a second cluster may include a second processor core and a second addressable memory. The first cluster and the second cluster may be arranged in different locations within the heterogeneous multicore chip. As a result, the first addressable memory may be considered a local addressable memory of the first processor core due to the closer physical proximity to the first processor core and a remote addressable memory of the second processor core due to the farther physical proximity to the second processor core. Similarly, the second addressable memory may be considered a local addressable memory of the second processor core due to the closer physical proximity to the second processor core and a remote addressable memory of the first processor core due to the farther physical proximity to the first processor core.

The memory management unit may be configured to monitor the number of local accesses to local addressable memories and the number of remote accesses to remote addressable memories by each processor core within the heterogeneous multicore chip. The memory management unit may be configured to evaluate the suitability of swapping data between two or more addressable memories. Such swapping may be suitable when it maximizes the total number of local accesses and minimizes the total number of remote accesses by the processor cores when compared to no swapping. If the memory management unit determines that the swapping is suitable, then the memory management unit may be configured to initiate the swapping between the addressable memories.

Figure 1:
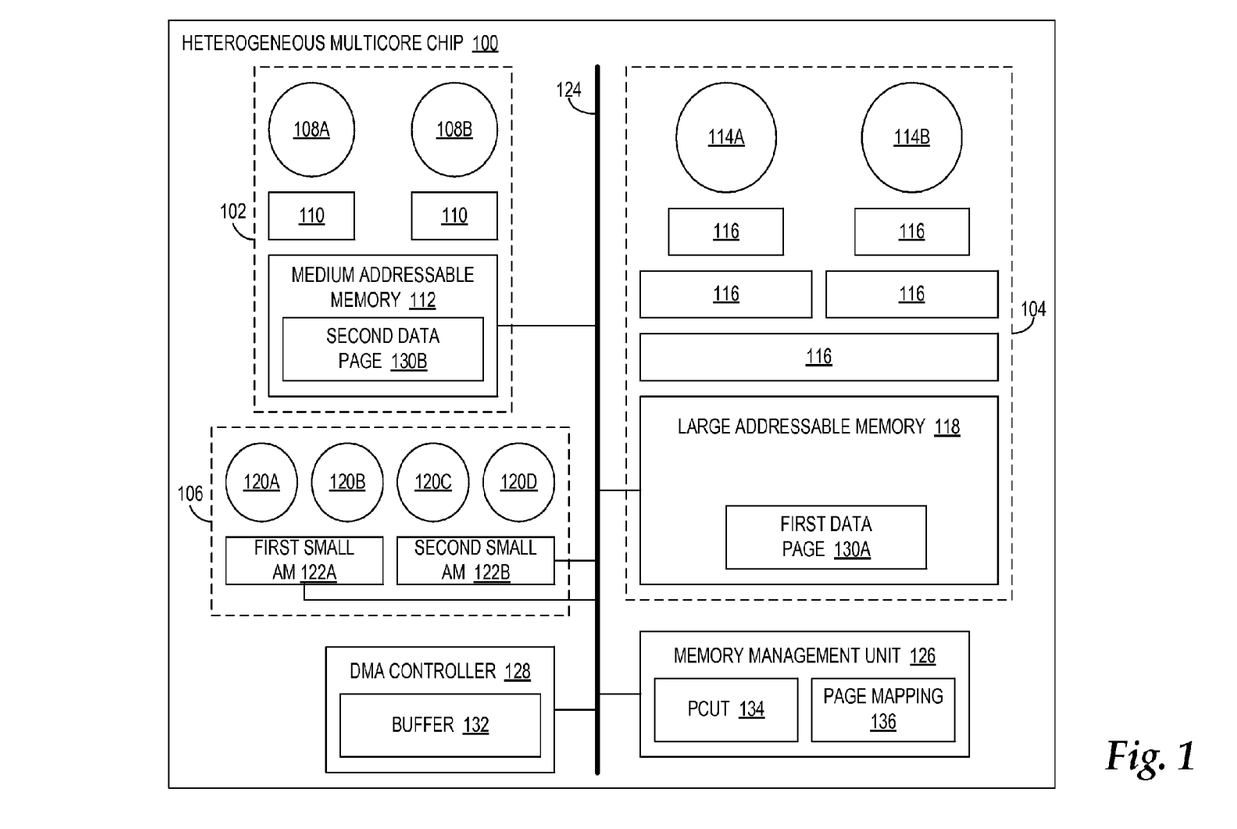
FIG. 1 is a functional block diagram illustrating an example heterogeneous multicore chip.

FIG. 1 is a functional block diagram illustrating an example heterogeneous multicore chip 100, arranged in accordance with least some embodiments presented herein. The heterogeneous multicore chip 100 may include a first cluster 102, a second cluster 104, and a third cluster 106. The first cluster 102 may include a first small processor core 108A and a second small processor core 108B. The memory hierarchy for the small processor cores 108A-108B may include a single-level cache hierarchy 110. For example, the single-level cache hierarchy 110 may include one or more cache memories that may or may not be shared by the small processor cores 108A-108B. The single-level cache hierarchy 110 may be backed up by a medium addressable memory 112.

The second cluster 104 may include a first large processor core 114A and a second large processor core 114B. The first large processor core 114A may be coupled to a multi-level cache hierarchy 116. For example, the multi-level cache hierarchy 116 may include one or more L1 cache memories, one or more L2 cache memories, or one or more L3 cache memories that may or may not be shared by the large processor cores 114A-114B. The multi-level cache hierarchy 116 may be backed up a large addressable memory 118.

The third cluster 106 may include a first graphics processor core 120A, a second graphics processor core 120B, a third graphics processor core 120C, and a fourth graphics processor core 120D. The third cluster 106 may further include a first small addressable memory 122A and a second small addressable memory 122B. The medium addressable memory 112, the large addressable memory 118, and the small addressable memories 122A-122B may be coupled via an interconnection bus 124 or other network. The heterogeneous multicore chip 100 may also include a memory management unit 126 and a direct memory access ("DMA") controller 128 coupled to the interconnection bus 124. The memory management unit 126 may be on-chip or off-chip. It should be appreciated that the configuration and arrangement of mixed processor cores and mixed memory hierarchies illustrated in the heterogeneous multicore chip 100 is merely an example. Various other configurations and/or arrangements are contemplated herein.

As illustrated in FIG. 1, each of the clusters 102, 104, 106 may be heterogeneous in terms of processor cores as well as memory hierarchy. The small processor cores 108A-108B may have lower performance and greater energy efficiency compared to the large processor cores 114A-114B. While the small processor cores 108A-108B and the large processor cores 114A-114B may be general purpose processor cores, the graphics processor cores 120A-120D may be special purpose processor cores designed for efficient manipulation of computer graphics.

The difference in sizes between the small processor cores 108A-108B and the large processor cores 114A-114B may be reflected in their respective memory hierarchies. Due to the lower performance of the small processor cores 108A-108B, the corresponding memory hierarchy may include a shallow cache hierarchy (e.g., the single-level cache hierarchy 110) and a smaller addressable memory (e.g., the medium addressable memory 112). Due to the greater performance of the large processor cores 114A-114B, the corresponding memory hierarchy may include a deep cache hierarchy (e.g., the multi-level cache hierarchy 116) and a larger addressable memory (e.g., the large addressable memory 118).

Generally, addressable memory may refer to memory that can be accessed directly by a memory address. Examples of addressable memory include an addressable buffer, a scratchpad memory, and a main memory. For example, a programmer can explicitly specify in a program where in addressable memory data can be stored or retrieved. In some embodiments, a physical memory space may define an address range that is reserved for addressable memories. These addressable memories may include off-chip addressable memories, such as a main memory of a computing system. These addressable memories may also include on-chip addressable memories, such as the medium addressable memory 112, the large addressable memory 118, and the small addressable memories 122A-122B, as well. The memory management unit 126 may be configured to manage memory accesses to the off-chip addressable memories or the on-chip addressable memories according to the address in the physical memory space. An example implementation of the physical memory space is described below with respect to FIG. 2.

The small processor cores 108A-108B may be in closer physical proximity to the medium addressable memory 112 than to the large addressable memory 118 or the small addressable memories 122A-122B. Thus, memory accesses to the medium addressable memory 112 by the small processor cores 108A-108B may be faster than memory accesses to the large addressable memory 118 or the small addressable memories 122A-122B. Similarly, the large processor cores 114A-114B may be in closer physical proximity to the large addressable memory 118 than to the medium addressable memory 112 or the small addressable memories 122A-122B. Thus, memory accesses to the large addressable memory 118 may be faster than memory accesses to the medium addressable memory 112 or the small addressable memories 122A-122B.

In an illustrative example, the first small processor core 108A may access a first data page 130A, which is located in a location in the large addressable memory 118 of the second cluster 104. The first data page 130A may be accessible via a first address. The second large processor core 114B may access a second data page 130B, which is located in a location in the medium addressable memory 112 of the first cluster 102. The second data page 130B may be accessible via a second address. For the sake of illustration, data segments are described herein in a fixed granularity of a data page. As used herein, a page may refer to a fixed size memory unit that may or may not correspond to an operating system's page. Other granularities of data segments are contemplated herein. In this example, the first small processor core 108A and the second large processor core 114B are accessing addressable memories that are not located in their own cluster. This can occur for various reasons, such as thread migration or poor memory allocation by an operating system. As a result, the first small processor core 108A and the second large processor core 114B may experience a longer latency compared to accessing addressable memories in their own cluster.

Because data pages 130A and 130B are located in different clusters from the processor cores that access the data pages 130A and 130B, the data pages 130A and 130B lack "distance locality." Distance locality can be improved by maximizing the number of local accesses (i.e., accesses to addressable memories within the same cluster as the requesting processor cores) and minimizing the number of remote accesses (i.e., accesses to addressable memories in different clusters than the requesting processor core). To this end, the memory management unit 126 may be configured to initiate a swap of the data pages 130A and 130B between their respective addressable memories. As a result of the swap, the first data page 130A may be located in the medium addressable memory 112, and the second data page 130B may be located in the large addressable memory 118. After the swap, the first small processor core 108A can access the first data page 130A using the first address as a local access within the same cluster rather than a remote access in another cluster. Similarly, the second large processor core 114B can access the second data page 130B using the second address as a local access within the same cluster rather than a remote access in another cluster.

When initiating the swap, the memory management unit 126 may be configured to instruct the DMA controller 128 to perform the swap. For example, the DMA controller 128 may be configured to mark the second data page 130B as unavailable, retrieve the second data page 130B from the medium addressable memory 112, and store the second data page 130B in a buffer 132. The DMA controller 128 may also be configured to mark the first data page 130A as unavailable, retrieve the first data page 130A from the large addressable memory 118, and store the first data page 130A in the buffer 132. The DMA controller 128 may be configured to store the first data page 130A in the medium addressable memory 112 and mark the first data page 130A as available. The DMA controller 128 may also be configured to store the second data page 130B in the large addressable memory 118 and mark the second data page 130B as available.

The above process for swapping data pages between addressable memories in the heterogeneous multicore chip 100 can be performed without invoking or informing the operating system because the first page is addressable using the original first address and the second page is addressable using the original second address. Rather, the swap can be performed via hardware (e.g., by the memory management unit 126) transparent to the operating system and without relying on expensive operating system mechanisms, such as modifying page tables or shooting down translation lookaside buffer ("TLB") entries. The swap may be performed for multiple pages between two or more addressable memories. In some embodiments, the swap may be a one-for-one swap where one data page in one addressable memory is swapped for another data page in another addressable memory. In some other embodiments, the swap may involve more than two pages from two or more addressable memories that form a single swap group.

For the sake of illustration, the present disclosure primarily describes swaps between addressable memories within the heterogeneous multicore chip 100. In some other embodiments, similar techniques may be applied to instances where one addressable memory is on-chip and another addressable memory is off-chip. Such techniques may be applied to swap data between an on-chip addressable memory and an off-chip addressable memory in order to increase the hit rate of the on-chip addressable memory.

The memory management unit 126 may be configured to monitor page usage by various processor cores or clusters of processor cores. In particular, the memory management unit 126 may be configured to collect page usage statistics and store these page usage statistics in a page-cluster usage table ("PCUT") 134. The memory management unit 126 may be configured to collect and update the page usage statistics at predefined time intervals. The time interval may be selected to be large enough so that the overhead from page swapping can be amortized over the length of the time interval. Further, the time interval may be selected to be smaller than the typical time quantum given to a thread or process by an operating system scheduler. This time quantum may refer to an amount of uninterrupted time allocated to a processor core for executing the thread or process. In some embodiments, the time quantum may be determined empirically based on the particular system. For example, various systems may employ different quanta sizes, and the latencies of addressable memories may be system specific. An example of the time interval may be somewhere within a range of about a few tens of microseconds up to about one millisecond.

The page usage statistics may include, for each addressable memory, a count of the number of accesses by each cluster of processors cores. The memory management unit 126 may be configured to implement multiple hardware counters for each addressable memory. Each counter may correspond to one of the clusters of processor cores. When a processor core of a cluster accesses an addressable memory, the memory management unit 126 may be configured to increment the hardware counter corresponding to the particular cluster and the particular addressable memory. An example implementation of the PCUT 134 is described below with respect to FIG. 3.

Periodically (e.g., in conjunction with a time interval for updating the PCUT 134), the memory management unit 126 may be configured to compute a page mapping 136 that maximizes distance locality, thereby minimizing physical distance to access data, based on the page usage statistics in the PCUT 134. The page mapping 136 may define an optimal location of pages that maximizes the number of local accesses by the processor cores and minimizes the number remote accesses by the processor cores. The memory management unit 126 may be configured to select one or more pages to be swapped between two or more addressable memories based on the page mapping 136.

The memory management unit 126 may be configured to determine the page mapping 136 by generating multiple swapping groups and evaluating a suitability of each swapping group. A swapping group may be configured to include pages that can be validly swapped with one another while still allowing each page to be addressed using its original physical address (i.e., the physical address prior to swap). Each swapping group may include pairs of data pages to be swapped. Thus, when a data page is present in one swapping group, the same data page cannot be present in another swapping group. The memory management unit 126 may be configured to determine multiple combinations of swapping groups. The combinations of swapping groups may define each possible mapping of pages to different locations.

For each possible mapping, the memory management unit 126 may be configured to determine a suitability value for each page in the mapping. The benefit value may refer to a number of local accesses to the mapped page, i.e., accesses by processor cores in the same cluster as the addressable memory where the page is located. The cost value may refer to a number of remote accesses to the mapped page, i.e., accesses by the processor cores in a different cluster than the addressable memory where the page is located. In some embodiments, the suitability value may be the cost value subtracted from the benefit value.

In some other embodiments, the suitability value may be compared against a threshold value. Here, swapping may be considered suitable if the suitability value exceeds the threshold value. Swapping may be considered not suitable if the suitability value is lower than the threshold value. The threshold value may refer to the overhead of swapping two pages divided by a difference in access time of remote versus local addressable memory.

The memory management unit 126 may be configured to sum the suitability values for each page to determine a total suitability value for a particular mapping. That is, each mapping may correspond to its own total suitability value. The memory management unit 126 may be configured to select the mapping having the highest total suitability value in order to maximize distance locality, thereby minimizing physical distance to access data. This selected mapping may be the page mapping 136. Upon selecting the mapping having the highest total suitability value, the memory management unit 126 may be configured to initiate the swap according to the page mapping 136.

Figure 2:
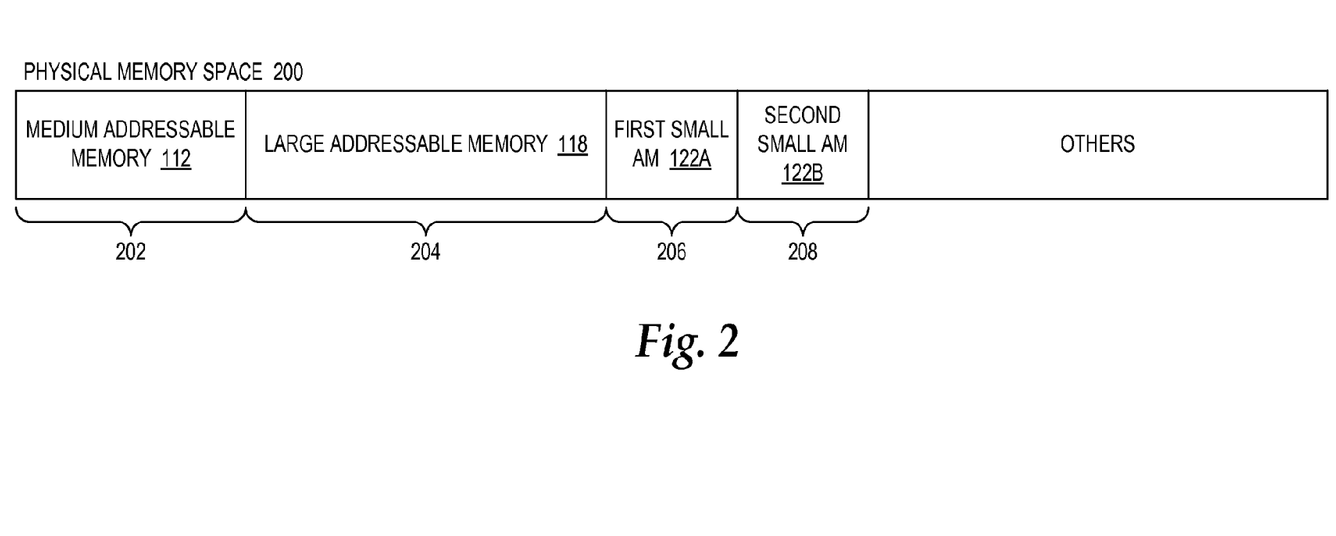
FIG. 2 is a diagram illustrating an example physical memory space.

FIG. 2 is a diagram illustrating an example physical memory space 200, arranged in accordance with at least some embodiments presented herein. In some embodiments, on-chip addressable memories in the heterogeneous multicore chip 100 may be mapped to the physical memory space 200. In this way, software can address the on-chip addressable memories in the same way that other memory is addressed. For example, the medium addressable memory 112 may be mapped to a first address range 202 of the physical memory space 200. The large addressable memory 118 may be mapped to a second address range 204 of the physical memory space 200. The first small addressable memory 122A may be mapped to a third address range 206 of the physical memory space 200. The second small addressable memory 122B may be mapped to a fourth address range 208 of the physical memory space. Due to space limitations, the first small addressable memory 122A and the second small addressable memory 122B may be labeled as the first small AM 122A and the second small AM 122B in FIG. 2.

Figure 3:
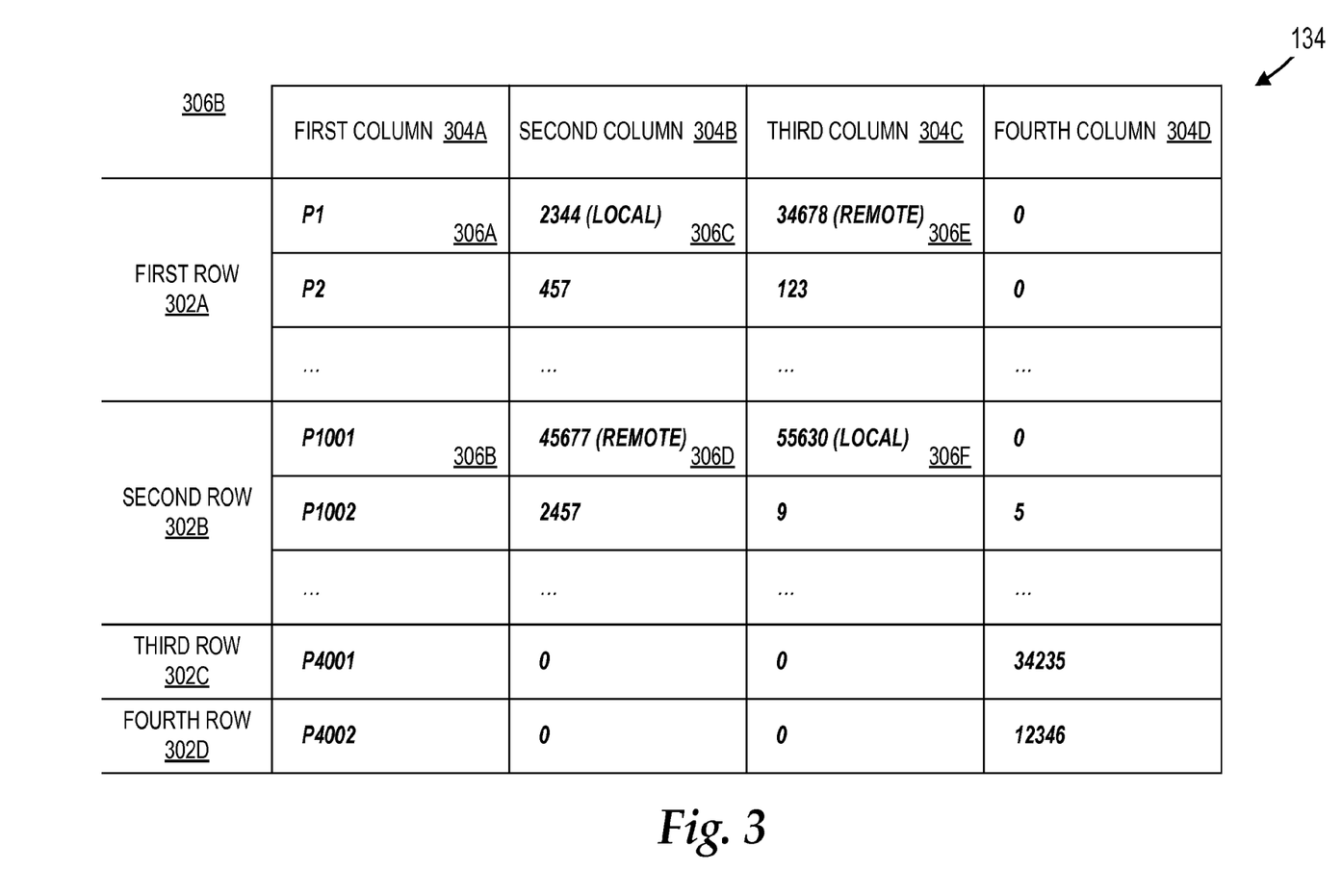
FIG. 3 is a diagram illustrating an example implementation of a page-cluster usage table.

FIG. 3 is a diagram illustrating an example implementation of the PCUT 134, arranged in accordance with at least some embodiments presented herein. The PCUT 134 may include multiple rows, multiple columns, and multiple cells, where cells correspond to one of the columns and one of the rows. The PCUT 134 may include a first row 302A, a second row 302B, a third row 302C, and a fourth row 302D. The first row 302A may be associated with the medium addressable memory 112. The second row 302B may be associated with the large addressable memory 118. The third row 302C may be associated with the first small addressable memory 122A. The fourth row 302D may be associated with the second small addressable memory 122B. The PCUT 134 may include additional rows associated with an additional addressable memory in the heterogeneous multicore chip 100. In some other embodiments, the PCUT 134 may include additional rows associated with off-chip addressable memories in instances where a swap is performed between an on-chip addressable memory and an off-chip addressable memory.

The PCUT 134 may also include a first column 304A, a second column 304B, a third column 304C, and a fourth column 304D. The first column 304A may be associated with the page numbers. The second column 304B may be associated with the small processor cores 108A-108B in the first cluster 102. The third column 304C may be associated with the large processor cores 114A-114B in the second cluster 104. The fourth column 304D may be associated with the graphics processor cores 120A-120D.

Under the first column 304A may be multiple cells, such as a first cell 306A and a second cell 306B, where each cell specifies a page number that identifies a particular data page. For example, the first cell 306A specifies a page P1, and the second cell 306B specifies a page P1001. Under the second column 304B may be multiple cells, such as a third cell 306C and a fourth cell 306D. Each cell under the second column 304B may contain a number of accesses to the data page specified under the first column 304A by the small processor cores 108A-108B. For example, the third cell 306C may specify that the small processor cores 108A-108B have accessed the page P1 2,344 times within a time interval. The fourth cell 306D may specify that the small processor cores 108A-108B have accessed the page P1001 45,677 times within the time interval.

Under the third column 304C may be multiple cells, such as a fifth cell 306E and a sixth cell 306F. Each cell may contain a number of accesses to the data page specified under the first column 304A by the large processor cores 114A-114B. For example, the fifth cell 306E may specify that the large processor cores 114A-114B have accessed the page P1 34,678 times within the time interval. The sixth cell 306F may specify that the large processor cores 114A-114B have accessed the page P1001 55,630 times. Under the fourth column 304D may be multiple cells where each cell contains a number of accesses to the data page specified under the first column 304A by the graphics processor cores 120A-120D in the third cluster 106.

When generating the page mapping 136, the memory management unit 126 may be configured to evaluate multiple swapping groups. An example swapping group may include the page P1 identified in the first cell 306A and the page P1001 identified in the second cell 306B. The access count contained in the third cell 306C may be a local access count for the medium addressable memory 112 because the small processor cores 108A-108B and the medium addressable memory 112 are in the same cluster (i.e., the first cluster 102). The access count contained in the fourth cell 306D may be a remote access count for the large addressable memory 118 because the small processor cores 108A-108B and the large addressable memory 118 are in different clusters. The access count contained in the fifth cell 306E maybe a remote access count for the medium addressable memory 112 because the large processor cores 114A-114B and the medium addressable memory 112 are in different clusters. The access count contained in the sixth cell 306F may be a local access count for the large addressable memory 118 because the large processor cores 114A-114B and the large addressable memory 118 are in the same cluster (i.e., the second cluster 104).

In this example, the benefit of not swapping the page P1 is 2,343 local accesses, and the cost of not swapping the page P1 is 34,678 remote accesses. Further, the benefit of not swapping the page P1001 is 55,630 local accesses, and the cost of not swapping the page P100 is 45,677 remote accesses. The total benefit of not swapping is the sum of 2,344 and 55,630, which equals 57,974 total local accesses. The total cost of not swapping is the sum of 34,678 and 45,677, which equals 80,355 total remote accesses. Here, the total number of remote accesses is greater than the total number of local accesses. Distance locality may be maximized by maximizing the number of local accesses and minimizing the number of remote accesses. Here, the total number of remote accesses is greater than the total number of number of local accesses. Thus, swapping the page P1 and the page P1001 can be suitable because the swap effectively converts what would have been remote accesses without the swap into local accesses and what would have been local accesses without the swap into remote accesses.

Suitability may be further evaluated by determining a net value by subtracting a cost from a benefit and comparing the net value with a threshold value. For example, the threshold value may be the average time needed to swap P1 and P1001, divided by the difference in average access time to the remote addressable memory and the average access time of the local addressable memory (i.e., benefit−cost>avgSwapTime/(avgtimeRemoteAM−avgtimeLocalAM)). If the left hand side of the inequality is larger, then swapping may be considered suitable. Otherwise, swapping may be considered not suitable.

Figure 4:
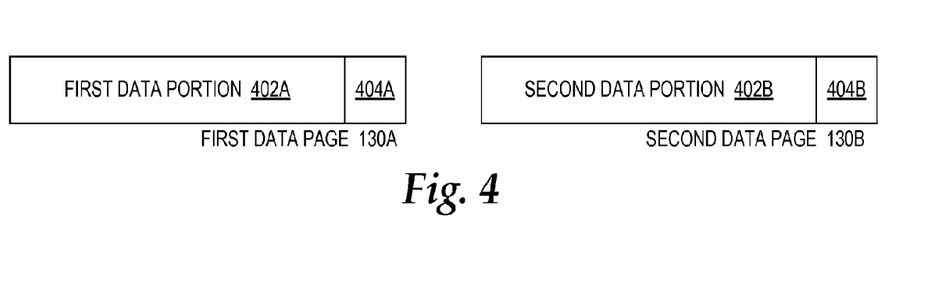
FIG. 4 is a diagram illustrating an example implementation of the first data page and the second data page.

FIG. 4 is a diagram illustrating an example implementation of the first data page 130A and the second data page 130B, arranged in accordance with at least some embodiments presented herein. The first data page 130A may include a first data portion 402A and a first swap status indicator 404A. The second data page 130B may include a second data portion 402B and a second swap status indicator 404B. The first swap status indicator 404A and the second swap status indicator 404B may be positioned at some constant offset for each data page.

When the first data page 130A and the second data page 130B are swapped, the physical locations where the first data page 130A and the second data page 130B are stored may change. However, the physical addresses through which the pages can be accessed do not change, thereby avoiding the need to involve the operating system in swapping the pages. The memory management unit 126 will need to be aware that the first data page 130A and the second data page 130B have been swapped. Some implementations may modify a page table and/or TLB entries to reflect the swap. However, these implementations may incur significant latency. In order to avoid modifying the page table and/or TLB entries, the first data page 130A may be augmented with a first swap status indicator 404A, and the second data page 130B may be augmented with a second swap status indicator 404B.

The first swap status indicator 404A and the second swap status indicator 404B may each be one or more bits or other suitable indicator that indicates the first data page 130A and the second data page 130B have been swapped. The first swap status indicator 404A and the second swap status indicator 404B may be initialized (e.g., as a zero bit) to indicate that no swap has occurred. After the first data page 130A and the second data page 130B have been swapped, the memory management unit 126 may be configured to modify (e.g., to a one bit) the first swap status indicator 404A and the second swap status indicator 404B to indicate that a swap has occurred.

In an illustrative example, prior to the swap, the first data page 130A may be located at a first memory location, and the second data page 130B may be located at a second memory address. After the swap, the first data page 130A may be located at the second memory address, and the second data page 130B may be located at the first memory address. When a processor core attempts to access the first data page 130A at the first memory address, the processor core may read the second swap status indicator 404B contained in the second data page 130B. The second swap status indicator 404B may indicate that a swap has occurred. The processor core may be aware of the swap group containing the first data page 130A and the second data page 130B from the page mapping 136 in the memory management unit 126. Thus, upon reading the second swap status indicator 404B, the processor core may correctly access the first data page 130A at the second memory address. In this way, a processor core can still access the first data page 130A via the first memory address even after swapping.

Figure 5:
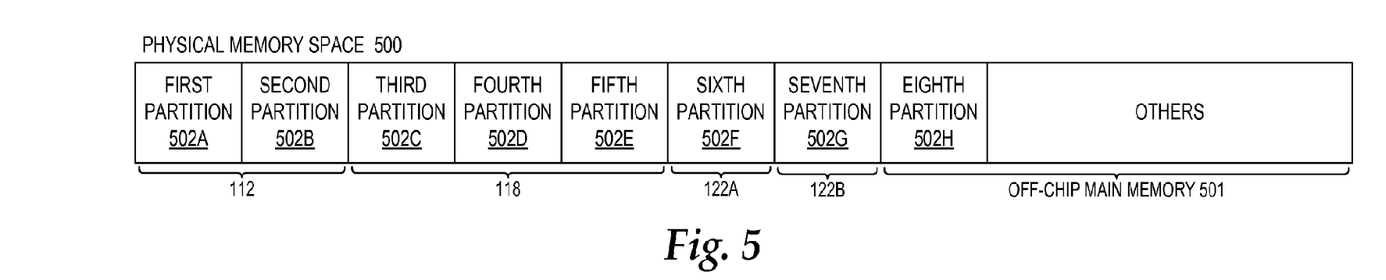
FIG. 5 is a diagram illustrating an example implementation where multiple addressable memories are included in a single swap group.

FIG. 5 is a diagram illustrating an example implementation where multiple addressable memories are included in swap groups, arranged in accordance with at least some embodiments presented herein. In particular, FIG. 5 illustrates a physical memory space 500, which is adapted to include multiple addressable memories. Some example addressable memories may include the medium addressable memory 112, the large addressable memory 118, the first small addressable memory 122A, the second small addressable memory 122B, and off-chip addressable memory 501. In order to form swap groups that allow a page to be relocated to any addressable memory, the addressable memories 112, 118, 112A-122B, 501 may be divided further into partitions. According to an example implementation illustrated in FIG. 5, the medium addressable memory 112 may be divided into a first partition 502A and a second partition 502B. The large addressable 118 204 may be divided into a third partition 502C, a fourth partition 502D, and a fifth partition 502E. The first small addressable memory 122A may be small enough that it corresponds to only one partition, i.e., the sixth partition 502F. Additionally, the second small addressable memory 122B may be small enough that it corresponds to only one partition, i.e., the seventh partition 502G. A part of the off-chip main memory may be allocated an eighth partition 502H.

Generally, the $N^{th}$ page from each of the partitions 502A-502H may form a swap group. In one example, each first data page from the partitions 502A-502H may form a first swap group. In a second example, each second data page from the partitions 502A-502H may form a second swap group. In a third example, each third data page from the partitions 502A-502H may form a third swap group. The previously described sequence may continue for each corresponding data page in the partitions 502A-502H. Other configurations of swap groups containing pages from each of the partitions 502A-502 may also be contemplated. This allows any page in any addressable memory to be relocated to another addressable memory.

Each data page in a given swap group may include a swap status indicator (not shown in FIG. 5) as previously described with respect to FIG. 4. In the previous example described in FIG. 4, only two addressable memories were contained in a swap group. As a result, the swap status indicator could be implemented as a single bit in the previous example. In the example illustrated in FIG. 5, the swap group may include the eight partitions 502A-502H from the on-chip addressable memories 112, 118, 122A-122B and the off-chip addressable memory 501. In order to account for potential swaps between the eight partitions 502A-502H, the swap status indicator for each page may be implemented to include three bits. By utilizing the three bits, the swap status indicator can represent eight values, each of which corresponds to one of the eight partitions 502A-502H. For example, a first value '000' may represent the first partition 502A, a second value '001' may represent the second partition 502B, and so on.

Figure 6:
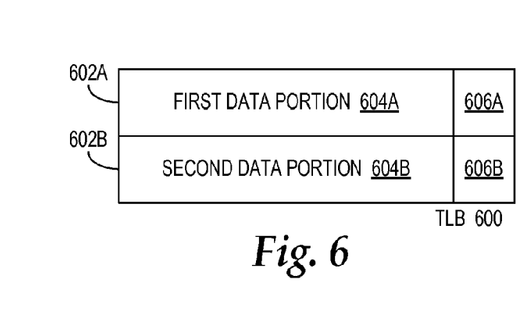
FIG. 6 is a diagram illustrating an example translation lookaside buffer.

FIG. 6 is a diagram illustrating an example TLB 600, arranged in accordance with at least some embodiments presented herein. The TLB 600 may include a first TLB entry 602A and a second TLB entry 602B. The first TLB entry 602A may include a first data portion 604A and a first status hint indicator 606A. The second TLB entry 602B may include a second data portion 604B and a second status hint indicator 606B. The first TLB entry 602A may correspond to the first data page 130A. The second TLB entry 602B may correspond to the second data page 130B.

The first status hint indicator 606A and the second status hint indicator 606B may each be one or more bits or other suitable indicator that caches the first swap status indicator 404A and the second swap status indicator 404B. That is, when the memory management unit 126 modifies the first swap status indicator 404A and the second swap status indicator 404B, the memory management unit 126 may be configured to cache the modification in the first status hint indicator 606A and the second status hint indicator 606B.

In an illustrative example, prior to the swap, the first data page 130A may be located at a first memory address, and the second data page 130B may be located at a second memory address. After the swap, the first data page 130A may be located at the second memory address, and the second data page 130B may be located at the first memory address. When a processor core attempts to access the first data page 130A at the first memory address, the processor core may read the first status hint indicator 606A, which may indicate that a swap has occurred. The processor core may be aware of the swap group containing the first data page 130A and the second data page 130B from the page mapping 136 in the memory management unit 126. Thus, upon reading the first status hint indicator 606A indicating that swap has occurred, the processor core may correctly access the first data page 130A at the second memory address instead of the first memory address.

In the illustrative example, at some point after the first swap, the first data page 130A and the second data page 130B may return to their original locations after another swap. After this second swap, the first data page 130A may be located at the first memory address, and the second data page 130B may be located at the second memory address. In order to modify the first status hint indicator 606A and the second status hint indicator 606B to reflect the second swap, the memory management unit 126 may perform a TLB shootdown, which can incur significant latency. Thus, in order to avoid incurring this additional latency, the memory management unit 126 may leave the first status hint indicator 606A and the second status hint indicator 606B as incorrect.

When a processor core attempts to access the first data page 130A at the first memory address, the processor core may read the first status hint indicator 606A, which may indicate that a swap has occurred. Upon reading the first status hint indicator 606A, the processor core may attempt to access the second data page 130B at the second memory address. The processor core may read the second swap status indicator 404B, which indicates that a swap did not occur. As a result, the processor core may correctly access the first data page 130A at the first memory address. Then, the processor core can update the first status hint indicator 606A to indicate a swap did not occur.

Figure 7:
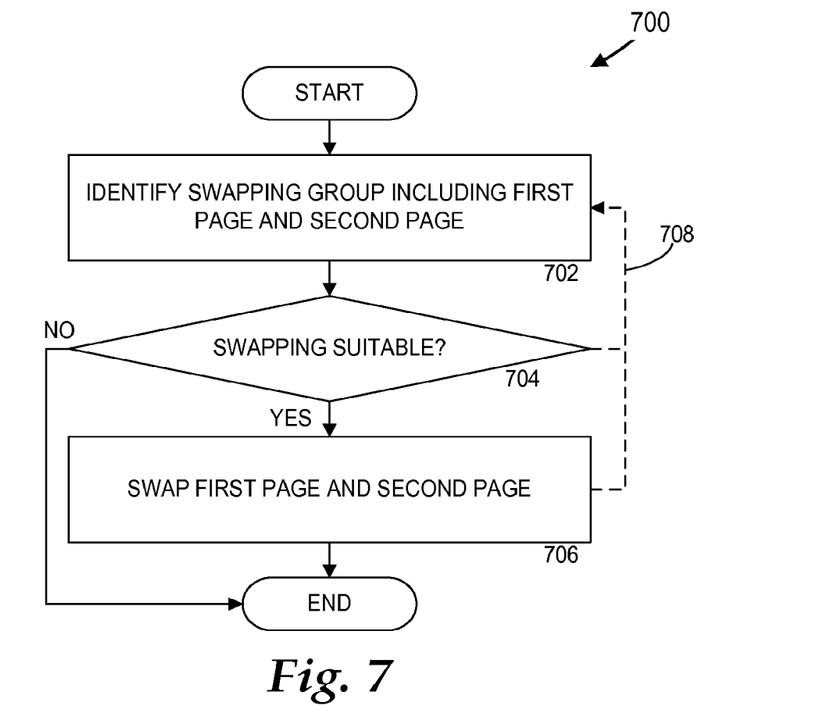
FIG. 7 is a flow diagram illustrating an example process adapted to manage addressable memories within the heterogeneous multicore chip.

FIG. 7 is a flow diagram illustrating an example process 700 adapted to manage addressable memories within the heterogeneous multicore chip, arranged in accordance with at least some embodiments presented herein. The process 700 may include various operations, functions, or actions as illustrated by one or more blocks 702 through 706.

The process 700 may begin at block 702 (Identify Swapping Group Including First Page and Second Page), the memory management unit 126 may be configured to identify a swapping group that includes a first data page and a second data page. The first data page and the second data page may be located in separate addressable memories in separate clusters within the heterogeneous multiple core chip. For example, a first cluster may include a first set of processor cores and a first addressable memory that contains the first data page. A second cluster may include a second set of processor cores and a second addressable memory that contains the second data page. Block 702 may be followed by block 704.

At block 704 (Swapping Suitable?), the memory management unit 126 may be configured to determine whether the swapping is suitable. Swapping may be suitable when the benefit of swapping exceeds the cost of swapping. The memory management unit 126 may be configured to determine the benefit of swapping by identifying the total number of remote accesses to the first data page and the second data page. A remote access may refer to an access to an addressable memory by a processor core in a different cluster than the addressable memory. For example, accesses by the second set of processor cores to the first data page may be remote accesses. Accesses by the first set of processor cores to the second data page may also be remote accesses.

The memory management unit 126 may be configured to determine the cost of swapping by identifying the total number of local accesses to the first data page and the second data page. A local access may refer to access to an addressable memory by a processor core in the same cluster as the addressable memory. For example, accesses by the first set of processor cores to the first data page may be local accesses. Accesses by the second set of processor cores to the second data page may also be local accesses. If the benefit of swapping exceeds the cost of swapping by at least a threshold amount, then swapping may be deemed as suitable. If the benefit of swapping does not exceed the cost of swapping, the swapping may be deemed as not suitable. If swapping is suitable, then block 704 may be followed by block 706. If swapping is not suitable, then the process 700 may either repeat (e.g., periodically, continuously, or on demand as needed) for additional swapping groups, as indicated by a feedback loop 708, or terminate.

At block 706 (Swap First Page and Second Page), the memory management unit 126 may be configured to initiate a swap between the first data page and the second data page. For example, the memory management unit 126 may be configured to instruct the DMA controller 128 to perform the swap. After the swap, the first data page may be contained in the second addressable memory where the second data page was previously located, and the second data page may be contained in first addressable memory where the first data page was previously located. After block 706, the process 700 may either repeat (e.g., periodically, continuously, or on demand as needed) for additional swapping groups, as indicated by the feedback loop 708, or terminate.

Figure 8:
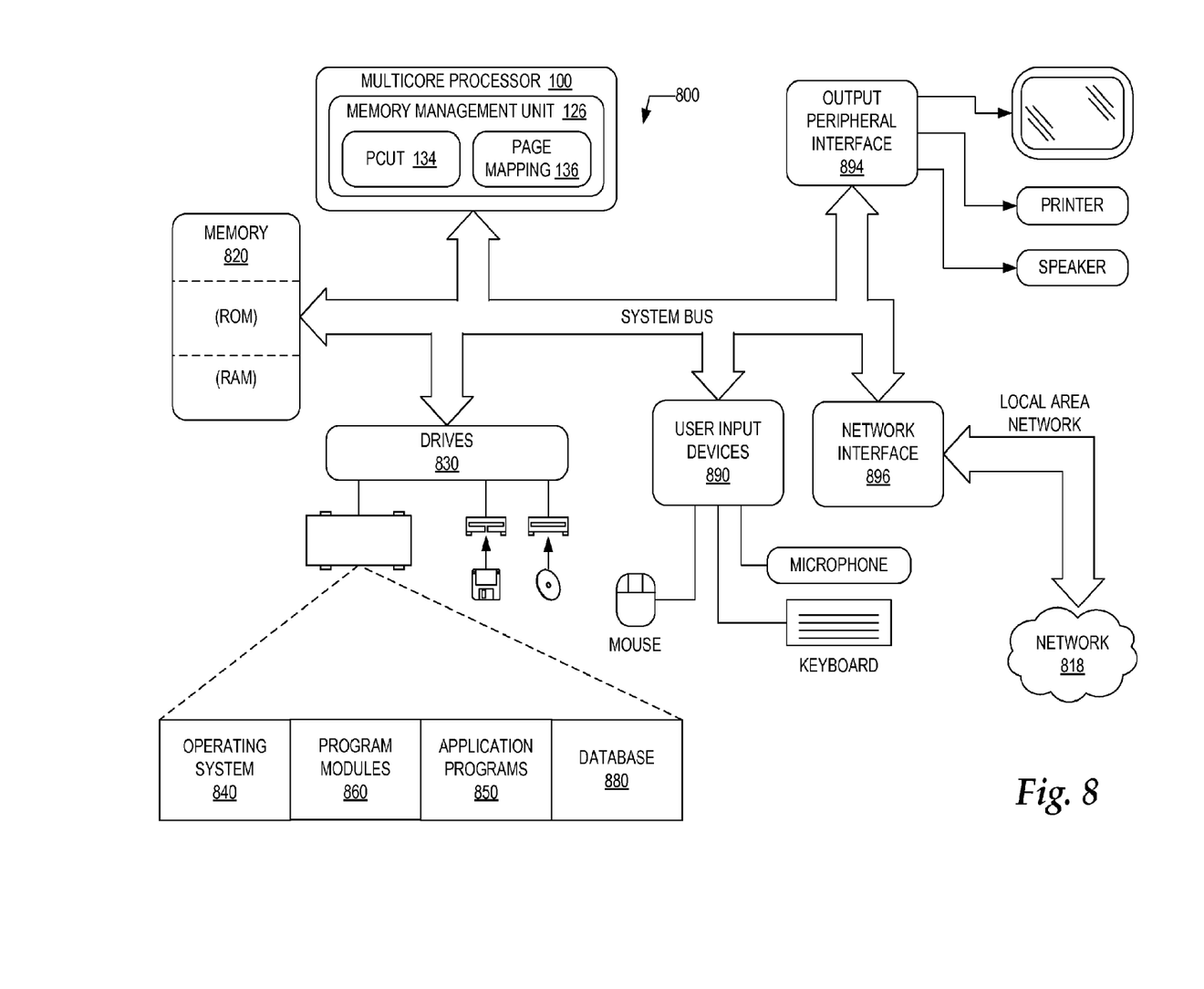
FIG. 8 is a block diagram illustrating a computer hardware architecture for an example computing system.

FIG. 8 is a block diagram illustrating a computer hardware architecture for an example computing system, arranged in accordance with at least some embodiments presented herein. FIG. 8 includes a computer 800, including the heterogeneous multicore chip 100, memory 820, and one or more drives 830. The heterogeneous multicore chip 100 may include the memory management unit 126, which may further include the PCUT 134 and the page mapping 136. The computer 800 may be implemented as a conventional computer system, an embedded control computer, a laptop, or a server computer, a mobile device, a set-top box, a kiosk, a vehicular information system, a mobile telephone, a customized machine, or other hardware platform.

The drives 830 and their associated computer storage media, provide storage of computer readable instructions, data structures, program modules and other data for the computer 800. The drives 830 can include an operating system 840, application programs 850, program modules 860, and a database 880. The computer 800 further includes user input devices 890 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be coupled to the processor 100 through a user input interface that is coupled to a system bus, but may be coupled by other interface and bus structures, such as a parallel port, game port or a universal serial bus ("USB"). Computers such as the computer 800 may also include other peripheral output devices such as speakers, which may be coupled through an output peripheral interface 894 or the like.

The computer 800 may operate in a networked environment using logical connections to one or more computers, such as a remote computer coupled to a network interface 896. The remote computer may be a personal computer, a server, a router, a network PC, a peer device or other common network node, and can include many or all of the elements described above relative to the computer 800. Networking environments are commonplace in offices, enterprise-wide area networks ("WAN"), local area networks ("LAN"), intranets, and the Internet.

When used in a LAN or WLAN networking environment, the computer 800 may be coupled to the LAN through the network interface 896 or an adapter. When used in a WAN networking environment, the computer 800 typically includes a modem or other means for establishing communications over the WAN, such as the Internet or a network 818. The WAN may include the Internet, the illustrated network 818, various other networks, or any combination thereof. It will be appreciated that other mechanisms of establishing a communications link, ring, mesh, bus, cloud, or network between the computers may be used.

According to some embodiments, the computer 800 may be coupled to a networking environment. The computer 800 may include one or more instances of a physical computer-readable storage medium or media associated with the drives 830 or other storage devices. The system bus may enable the processor 100 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 820, whether characterized as RAM, ROM, flash, or other types of volatile or nonvolatile memory technology. The media may also represent secondary storage, whether implemented as the storage drives 830 or otherwise. Hard drive implementations may be characterized as solid state, or may include rotating media storing magnetically-encoded information.

The storage media may include one or more program modules 860. The program modules 860 may include software instructions that, when loaded into the processor 100 and executed, transform a general-purpose computing system into a special-purpose computing system. As detailed throughout this Detailed Description, the program modules 860 may provide various tools or techniques by which the computer 800 may participate within the overall systems or operating environments using the components, logic flows, and/or data structures discussed herein.

The processor 100 may be constructed from any number of transistors or other circuit elements, which may individually or collectively assume any number of states. More specifically, the processor 100 may operate as a state machine or finite-state machine. Such a machine may be transformed to a second machine, or specific machine by loading executable instructions contained within the program modules 860. These computer-executable instructions may transform the processor 100 by specifying how the processor 100 transitions between states, thereby transforming the transistors or other circuit elements constituting the processor 100 from a first machine to a second machine. The states of either machine may also be transformed by receiving input from the one or more user input devices 890, the network interface 896, other peripherals, other interfaces, or one or more users or other actors. Either machine may also transform states, or various physical characteristics of various output devices such as printers, speakers, video displays, or otherwise.

Encoding the program modules 860 may also transform the physical structure of the storage media. The specific transformation of physical structure may depend on various factors, in different implementations of this Detailed Description. Examples of such factors may include, but are not limited to: the technology used to implement the storage media, whether the storage media are characterized as primary or secondary storage, and the like. For example, if the storage media are implemented as semiconductor-based memory, the program modules 860 may transform the physical state of the semiconductor memory 820 when the software is encoded therein.

For example, the software may transform the state of transistors, capacitors, or other discrete circuit elements constituting the semiconductor memory 820.

As another example, the storage media may be implemented using magnetic or optical technology such as drives 830. In such implementations, the program modules 860 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present detailed description.

Figure 9:
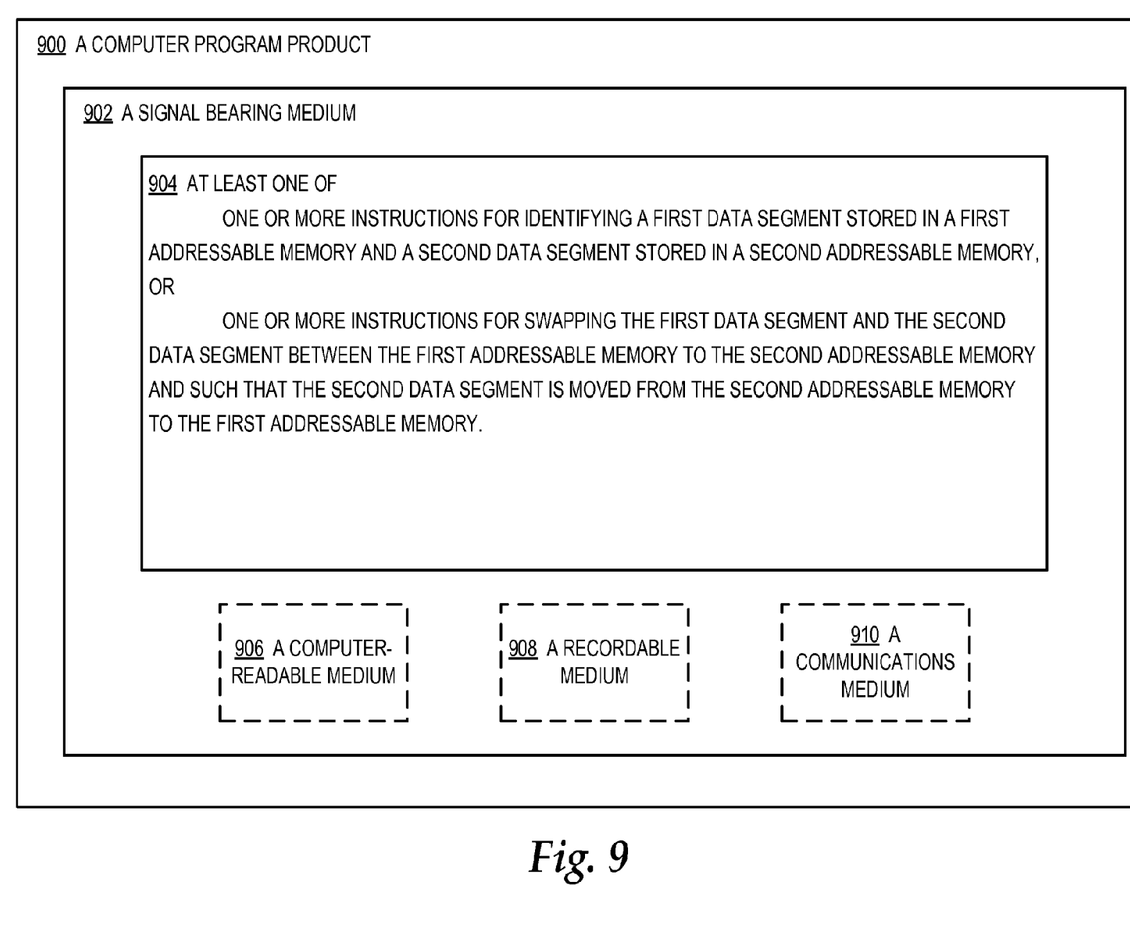
FIG. 9 is a schematic diagram illustrating a computer program product that includes a computer program for executing a computer process on a computing device.

FIG. 9 is a schematic diagram that illustrates a computer program product 900 that includes a computer program for executing a computer process on a computing device, arranged in accordance with at least some embodiments presented herein. An illustrative embodiment of the example computer program product is provided using a signal bearing medium 902, and may include at least one instruction of 904: one or more instructions for identifying a first data segment stored in a first addressable memory and a second data segment stored in a second addressable memory; or one or more instructions for swapping the first data segment and the second data segment such that the first data segment is moved from the first addressable memory to the second addressable memory and such that the second data segment is moved from the second addressable memory to the first addressable memory. In some embodiments, the signal bearing medium 902 of the one or more computer program products 900 includes a computer readable medium 906, a recordable medium 908, or a communications medium 910.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, and the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the Detailed Description, claims, or Figures, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to manage addressable memory in a heterogeneous multicore chip on a computer, comprising:
   identifying a first data segment stored in a first addressable memory and a second data segment stored in a second addressable memory, wherein the first data segment is accessible from the first addressable memory via a first memory address, and wherein the second data segment is accessible from the second addressable memory via a second memory address;
   determining, based on distance locality, whether swapping the first data segment stored in the first addressable memory with the second data segment stored in the second addressable memory is suitable by:
      computing a benefit measure to swap the first data segment and the second data segment based on a sum of a first remote access count of remote accesses to the first data segment over a time interval and a second remote access count of remote accesses to the second data segment over the time interval,
      computing a cost measure to swap the first data segment and the second data segment based on a sum of a first local access count of local accesses to the first data segment over the time interval and a second local access count of local accesses to the second data segment over the time interval, and
      determining whether the benefit measure exceeds the cost measure by a threshold amount; and
   in response to determination that the swapping is suitable based on the benefit measure being determined to exceed the cost measure by the threshold amount, swapping the first data segment and the second data segment such that the first data segment is moved from the first addressable memory to the second addressable memory and such that the second data segment is moved from the second addressable memory to the first addressable memory, wherein the first data segment is accessible from the second addressable memory via the first memory address, and wherein the second data segment is accessible from the first addressable memory via the second memory address.

2. The method of claim 1, further comprising:
   in response to swapping the first data segment and the second data segment, updating a first swap status indicator associated with the first data segment to indicate that the first data segment has been moved from the first addressable memory to the second addressable memory; and
   in response to swapping the first data segment and the second data segment, updating a second swap status indicator associated with the second data segment to indicate that the second data segment has been moved from the second addressable memory to the first addressable memory.

3. The method of claim 1, wherein the threshold amount comprises a zero value, a positive constant, or a parameter that is computed by division of an average time to swap the first data segment and the second data segment by a difference in average remote addressable memory access time and average local addressable memory access time.

4. The method of claim 1, wherein computing the benefit measure to swap the first data segment and the second data segment further comprises:
   determining the first remote access count of remote accesses to the first data segment over the time interval; and
   determining the second remote access count of remote accesses to the second data segment over the time interval.

5. The method of claim 1, wherein computing the cost measure to swap the first data segment and the second data segment further comprises:
   determining the first local access count of local accesses to the first data segment over the time interval; and
   determining the second local access count of local accesses to the second data segment over the time interval.

6. The method of claim 5, wherein determining the first local access count of local accesses to the first data segment over the time interval comprises:
   identifying access to the first data segment by a first processor core on the heterogeneous multicore chip; and
   responsive to identifying access to the second data segment by the first processor core, incrementing the first local access count.

7. An apparatus usable with a heterogeneous multicore chip, the apparatus comprising:
   a first memory hierarchy coupled to a first cluster of processor cores, the first memory hierarchy comprising a first addressable memory;
   a second memory hierarchy coupled to a second cluster of processor cores, the second memory hierarchy comprising a second addressable memory; and
   a memory management unit adapted to:
      identify a first data segment stored in the first addressable memory and a second data segment stored in the second addressable memory, wherein the first data segment is accessible from the first addressable memory via a first memory address, and wherein the second data segment is accessible from the second addressable memory via a second memory address,
      determine, based on distance locality, whether swapping the first data segment stored in the first addressable memory with the second data segment stored in the second addressable memory is suitable by:
         computation of a benefit measure to swap the first data segment and the second data segment based on a sum of a first remote access count of remote accesses to the first data segment and a second remote access count of remote accesses to the second data segment over a time interval,
         computation of a cost measure to swap the first data segment and the second data segment based on a sum of a first local access count of local accesses to the first data segment and a second local access count of local accesses to the second data segment over the time interval, and determination of whether the benefit measure exceeds the cost measure by a threshold amount; and in response to determination that the swapping is suitable based on the benefit measure being determined to exceed the cost measure by the threshold amount, swap the first data segment and the second data segment such that the first data segment is moved from the first addressable memory to the second addressable memory and such that the second data segment is moved from the second addressable memory to the first addressable memory, wherein the first data segment is accessible from the second addressable memory via the first memory address, and wherein the second data segment is accessible from the first addressable memory via the second memory address.

8. The apparatus of claim 7, wherein the memory management unit is further adapted to:

in response to the first data segment and the second data segment being swapped, update a first swap status indicator associated with the first data segment to indicate that the first data segment has been moved from the first addressable memory to the second addressable memory, and in response to the first data segment and the second data segment being swapped, update a second swap status indicator associated with the second data segment to indicate that the second data segment has been moved from the second addressable memory to the first addressable memory.

9. The apparatus of claim 7, wherein the threshold amount comprises a zero value, a positive constant, or a parameter that is computed by division of an average time to swap the first data segment and the second data segment by a difference in average remote addressable memory access time and average local addressable memory access time.

10. The apparatus of claim 7, wherein to compute the benefit measure, the memory management unit is further adapted to:

determine the first remote access count of remote accesses to the first data segment over the time interval; and determine the second remote access count of remote accesses to the second data segment over the time interval.

11. The apparatus of claim 10, wherein the first cluster of processor cores includes a first processor core and the second cluster of processor cores includes a second processor core; and wherein to determine the second remote access count of remote accesses to the second data segment over the time interval, the memory management unit is adapted to:

identify access to the second data segment by the first processor core, wherein the first processor core is in closer physical proximity to the first addressable memory than to the second addressable memory; and after access to the second data segment by the first processor core is identified, increment the second remote access count.

12. The apparatus of claim 11, wherein to determine the first remote access count of remote accesses to the first data segment over the time interval, the memory management unit is adapted to:

identify access to the first data segment by the second processor core, wherein the second processor core is in closer physical proximity to the second addressable memory than to the first addressable memory; and after access to the first data segment by the second processor core is identified, increment the first remote access count.

13. The apparatus of claim 12, wherein to compute the cost measure to swap the first data segment and the second data segment, the memory management unit is further adapted to:

determine the first local access count of local accesses to the first data segment over the time interval; and determine the second local access count of local accesses to the second data segment over the time interval.

14. The apparatus of claim 13, wherein to determine the first local access count of local accesses to the first data segment over the time interval, the memory management unit is adapted to:

identify access to the first data segment by the first processor core on the heterogeneous multicore chip; and after access to the second data segment by the first processor core is identified, increment the first local access count.

15. A computer-readable medium having computer-executable instructions stored thereon which, in response to execution by a computer, cause the computer to:

identify a swap group comprising a first page stored in a first addressable memory and a second page stored in a second addressable memory, the first addressable memory and the second addressable memory positioned on a heterogeneous multicore chip, the first addressable memory in closer physical proximity to a first cluster of processor cores than to a second cluster of processor cores on the heterogeneous multicore chip;

determine whether swapping the first page and the second page based on a local access count and a remote access count is suitable by:

computation of a benefit measure to swap the first page and the second page based on a sum of a first remote access count of remote accesses to the first page and a second remote access count of remote accesses to the second page over a time interval, computation of a cost measure to swap the first page and the second page based on a sum of a first local access count of local accesses to the first page and a second local access count of local accesses to the second page over the time interval, and determination of whether the benefit measure exceeds the cost measure by a threshold amount, wherein the first local access count is adapted to indicate accesses of the first page by the first cluster of processor cores over the time interval and the second local access count is adapted to indicate accesses of the second page by the second cluster of processor cores over the time interval, and the first remote access count is adapted to indicate accesses of the second page by the first cluster of processor cores over the time interval and the second remote access count is adapted to indicate accesses of the first page by the second cluster of processor cores over the time interval; and in response to determination that the swapping is suitable based on the benefit measure being determined to exceed the cost measure by the threshold amount, swap the first page and the second page such that the first page is stored in the second addressable memory and the second page is stored in the first addressable memory.

16. The computer-readable medium of claim 15, wherein the first addressable memory and the second addressable memory are mapped to a main memory address space.

\* \* \* \* \*